(12) United States Patent
Seo

(10) Patent No.: US 6,192,023 B1
(45) Date of Patent: Feb. 20, 2001

(54) OPTICAL PICK-UP FEEDING DEVICE HAVING A REGULATING MEMBER TO ADJUST AN ORIENTATION OF A LEAD SCREW THEREOF

(75) Inventor: Young-sun Seo, Sungnam (KR)

(73) Assignee: Samsung Electronics Co., LTD (KR)

( * ) Notice: Under 35 U.S.C. 154(b), the term of this patent shall be extended for 0 days.

(21) Appl. No.: 09/001,664

(22) Filed: Dec. 31, 1997

(30) Foreign Application Priority Data

May 28, 1997 (KR) .................................................. 97-21104

(51) Int. Cl.[7] .................................................. G11B 17/30
(52) U.S. Cl. .................................................. 369/219; 369/215
(58) Field of Search .................................. 369/219, 215, 369/244, 220; 360/104, 105, 106

(56) References Cited

U.S. PATENT DOCUMENTS

| | | | |
|---|---|---|---|
| 4,996,619 | * | 2/1991 | Negishi et al. ............ 360/109 |
| 5,243,591 | * | 9/1993 | Mogamiya ................. 369/244 |
| 5,761,182 | * | 6/1998 | Jeon ......................... 369/219 |
| 5,764,618 | * | 6/1998 | Kim .......................... 369/219 |
| 5,768,248 | * | 6/1998 | Lee ........................... 369/219 |

FOREIGN PATENT DOCUMENTS

| | | |
|---|---|---|
| 61-182962 | 11/1986 | (JP) . |
| 62-36483 | 3/1987 | (JP) . |
| 1-302583 | * 12/1989 | (JP) . |
| 2-68724 | 3/1990 | (JP) . |
| 7-26966 | 5/1995 | (JP) . |

* cited by examiner

*Primary Examiner*—Brian E. Miller
*Assistant Examiner*—Kenneth W Fields
(74) *Attorney, Agent, or Firm*—Staas & Halsey LLP

(57) ABSTRACT

An optical disc is read by being mounted on a turntable which rotates about a vertical axis, and moving an optical pick-up radially relative to the vertical axis. The optical pick-up is slidably mounted on a horizontal guide shaft and is threadedly mounted on a lead screw which is rotatable about a horizontal axis extending parallel to the guide shaft. A first end of the lead screw is connected to a motor, and the second end is mounted in a holder which is displaceable relative to the base to enable the second end to be displaced horizontally, in order to correct the horizontal orientation of the lead screw.

20 Claims, 3 Drawing Sheets

OPTICAL PICK-UP FEEDING DEVICE HAVING A REGULATING MEMBER TO ADJUST AN ORIENTATION OF A LEAD SCREW THEREOF

BACKGROUND OF THE INVENTION

1) Field of the Invention

The present invention relates to a pick-up feeding device for feeding an optical pick-up relative to an optical disc.

2) Description of the Prior Art

In general, an optical disc is used as a recording medium onto which information can be recorded or from which information can be reproduced, the information being contained on spiral or concentric tracks of the disc. The information recorded on the disc is reproduced by a disc loading device for loading/unloading the optical disc and an optical pick-up which projects laser beams on recording pits of the disc.

A conventional apparatus, as shown in FIGS. 1 and 2, includes a rotatable turntable 12 which is located on a deck base 10. Non-magnetized portions of the optical disc make contact with the turntable 12. The turntable 12 is engaged with a rotary shaft of a spindle motor 14 to be driven thereby. On one side of the spindle motor 14 are installed an optical pick-up 16 for recording and reproducing information on and from the disc, and a pick-up feeding device for feeding the optical pick-up in a radial direction of the optical disc.

The conventional pick-up feeding device includes a motor 20 which is mounted on the rear side of the deck base 10, a drive gear 22 which is engaged with a rotary shaft of the motor 20, a driven gear 24 which is rotated by the drive gear 22 and, a lead screw 26 which is rotatably mounted to the driven gear 24. A guide shaft 28, arranged parallel to the lead screw 26, guides a pick-up base 18 of the optical pick-up 16 which is fixed to the lead screw 26. The guide shaft 28 is mounted in supports 30 molded integrally with the base 10.

According to the conventional pick-up feeding device, a current is applied to the motor 20 when it is desired to record and reproduce information on and from an optical disc in contact with the upper surface of the turntable 12. The drive gear 22, the driven gear 24, and the lead screw 26 mounted to the driven gear 24 are all rotated, so that the pick-up base 18 is fed in a radial direction of the optical disc and guided by the guide shaft 28, to record and reproduce information on and from the optical disc.

Both ends of the guide shaft 28 are fixed to respective U-shaped fixing portions which are fixed to the deck base 10. An unthreaded end portion of the lead screw 26 is connected to the driven gear 24, and the other end thereof is rotatably mounted in a fixing portion 32 which is molded integrally with the deck base 10. The lead screw 26 and the guide shaft 28 are disposed in parallel to the feeding direction of the optical pick-up 16, i.e., the horizontal direction X.

However, in case the fixing portion 32 formed on the deck base 10 is twisted or shrunk during cooling processes of the fixing portion 32 after molding, the lead screw 26 becomes out of parallel to the horizontal X axis and the guide shaft 28 and becomes tilted in a direction (Z-direction). In the conventional pick-up feeding device, there is no separate means for regulating the parallel relationship of the lead screw 26 with the X axis, so the optical pick-up may not be smoothly fed due to the load exerted on the lead screw 26 by the pick-up base, and therefore the pick-up base 18 cannot be accurately halted at a desired position.

SUMMARY OF THE INVENTION

Therefore, it is an object of the present invention to provide a pick-up feeding device which can conveniently regulate the horizontal orientation of a lead screw, even if a lead screw holder has been shrunk or twisted.

In order to achieve the above-mentioned object of the present invention, there is provided an apparatus comprising a base, a turntable mounted on the base for rotation about a vertical axis and adapted to support an optical disc, and a first motor mounted on the base for rotating the turntable. A horizontal guide shaft is mounted on the base, and a horizontal lead screw is mounted on the base for rotation about a horizontal axis extending parallel to the guide shaft. A portion of the lead screw has an external screw thread. An optical pick-up is mounted on the guide shaft for sliding movement therealong, and is operably connected to the screw thread of the lead screw to be displaced thereby in a direction oriented radially with respect to the vertical axis in response to rotation of the lead screw. A second motor is mounted on the base and is operably connected to a first end portion of the lead screw for rotating the lead screw. A lead screw regulating member is mounted on the base for supporting a second end portion of the lead screw and is displaceable relative to the base for adjusting a horizontal orientation of the lead screw.

The lead screw regulating member is displaceable by being rotatable about a vertical axis, or by being linearly moveable in a direction generally perpendicular relative to the horizontal axis.

Preferably, the lead screw regulating member includes a holder which carries a recess in which the second end portion is mounted. A hollow bearing is preferably mounted in the holder, with the second end portion of the lead screw mounted in the hollow bearing for rotation therein about the horizontal axis.

BRIEF DESCRIPTION OF THE DRAWINGS

The above object and other advantages of the present invention will become more apparent by describing in detail preferred embodiments thereof with reference to the attached drawings in which.

DETAILED DESCRIPTION OF PREFERRED EMBODIMENTS OF THE INVENTION

Figure 1:
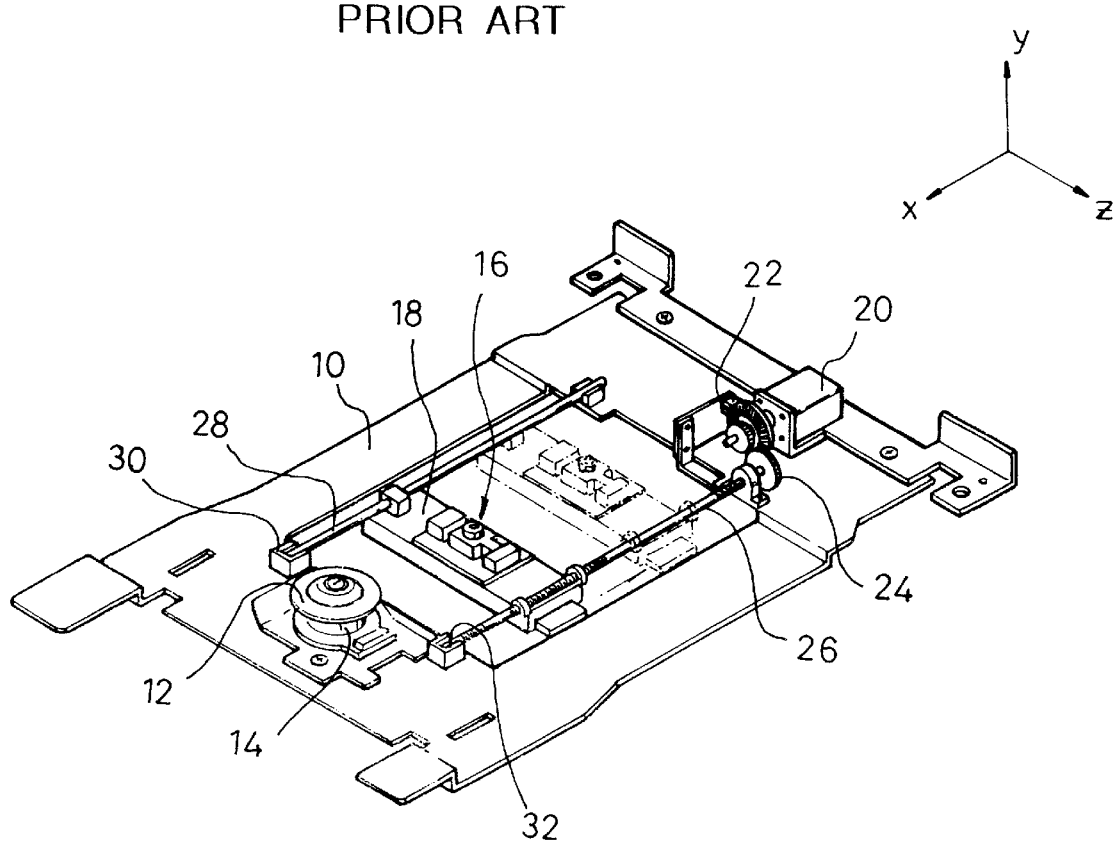
FIG. 1 is a conventional pick-up feeding device installed on a deck base.
Figure 2:
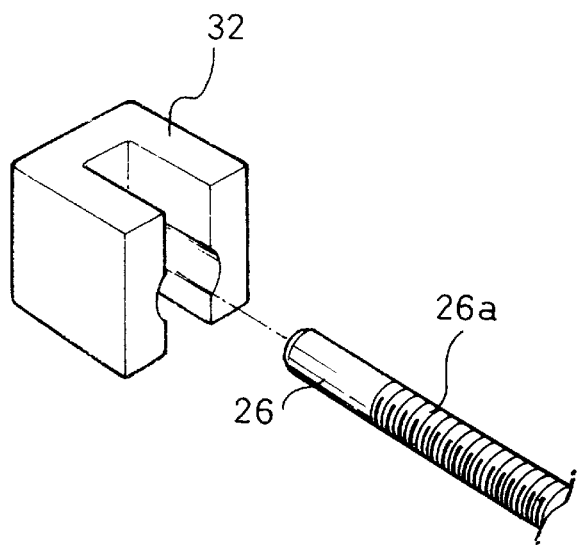
FIG. 2 is an enlarged view for showing a fixing portion to which a lead screw of the pick-up feeding device shown in FIG. 1 is rotatably mounted.

Hereinafter, a pick-up feeding device according to preferred embodiments of the present invention will be explained in more detail with reference to accompanying FIGS. 3A–5. Components which are the same as those of the conventional apparatus described in connection with FIGS. 1 and 2 will be given the same reference numerals in FIGS. 3A–5.

Figure 3A:
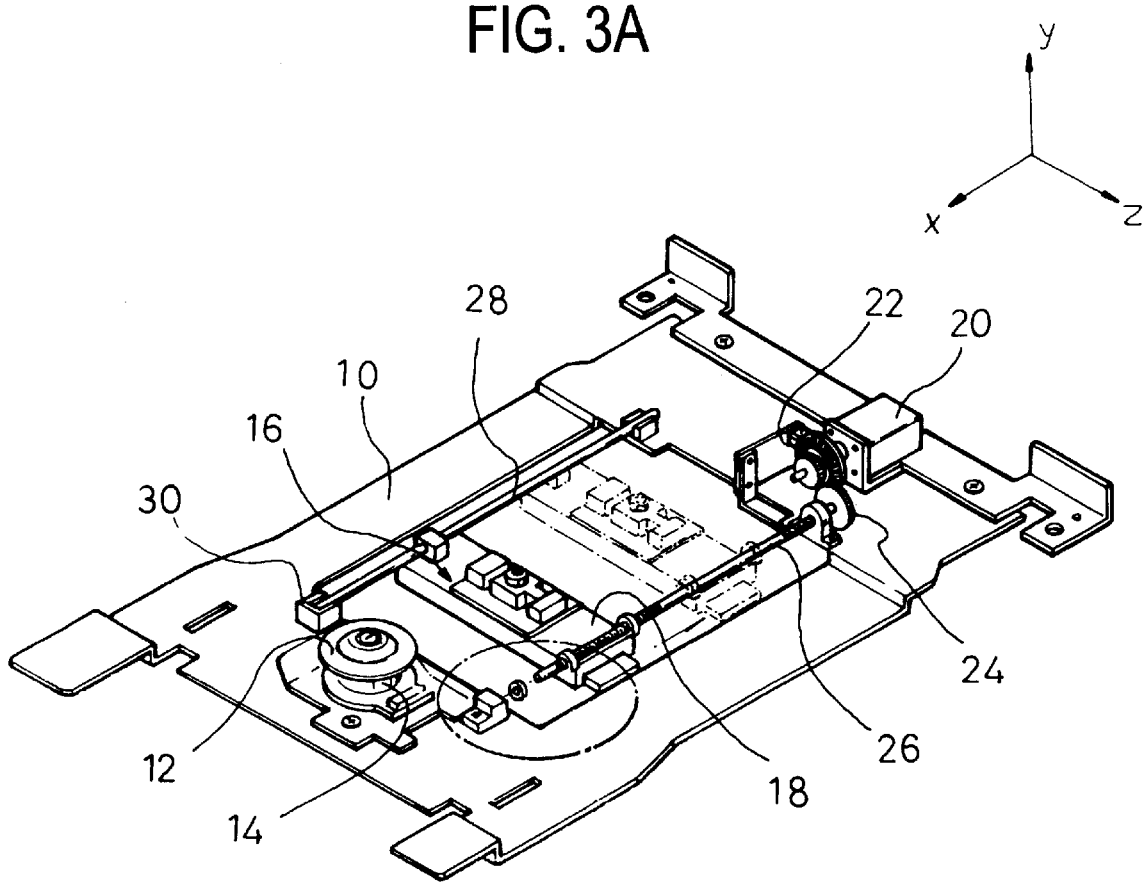
FIG. 3A is a perspective view for showing a pick-up feeding device according to a preferred embodiment of the present invention.
Figure 3B:
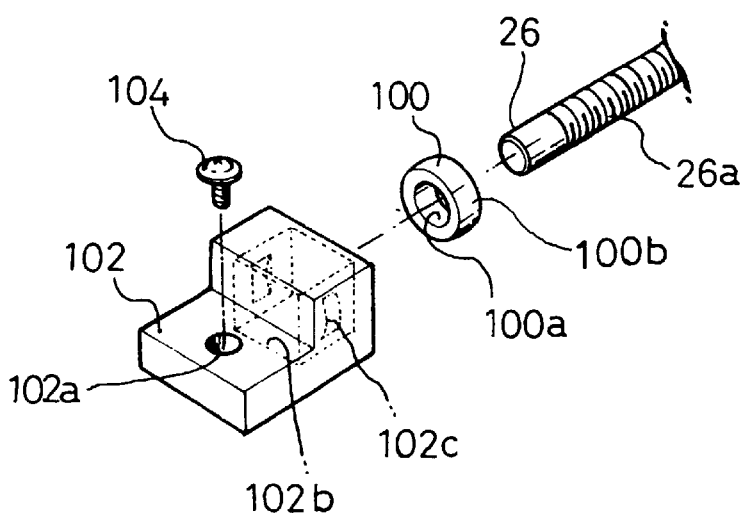
FIG. 3B is an enlargement of a support assembly shown in FIG. 3A for rotatably supporting an end of a lead screw.

Referring to FIGS. 3A and 3B, a turntable 12 with which a non-magnetized portion of an optical disc makes contact is mounted on the upper surface of a deck base 10. A motor 20 which drives and feeds an optical pick-up 16 in a radial direction of the optical disc is installed on one side of the turntable 12. A drive gear 22 is engaged with a rotary shaft of the motor 20, and a driven gear 24 is rotated by the drive gear 22. To the driven gear 24 is connected an unthreaded end portion of a lead screw 26 to linearly and reciprocatively feed a pick-up base 18 of the optical pick-up 16. The lead screw 26 is oriented parallel to a guide screw 28.

The other end portion of the lead screw 26 is supported by a spherical-bearing 100, i.e., a bearing having an outer surface 100b in the shape of a spherical segment. The bearing has a hollow portion 100a in which the lead screw 26 is rotatably mounted. The spherical-bearing 100 is fixed within a bearing holder 102 and regulates the horizontal orientation of the lead screw 26. The bearing holder 102 is fixed to the deck base 10 by a fixing member 104 such as a set screw shaft. The guide screw 28 is fixed to fixing portions 30 that are integral with the base 10.

Formed in the bearing holder 102, as shown in a enlarged portion of FIG. 3B are a through-hole 102a into which the fixing member 104 is inserted, and a bearing receiving recess 102b into which the spherical bearing 100 is inserted and press-fitted. Formed on inner surfaces of the bearing receiving recess 102b are bearing-receiving pockets 102c for maximizing the contact area with the spherical bearing 100 to prevent deviation of the spherical bearing 100 during the rotation of the lead screw 26.

Hereinafter, the operation of the pick-up feeding device according to the preferred embodiment of the present invention will be explained in detail with reference to FIG. 4.

Figure 4:
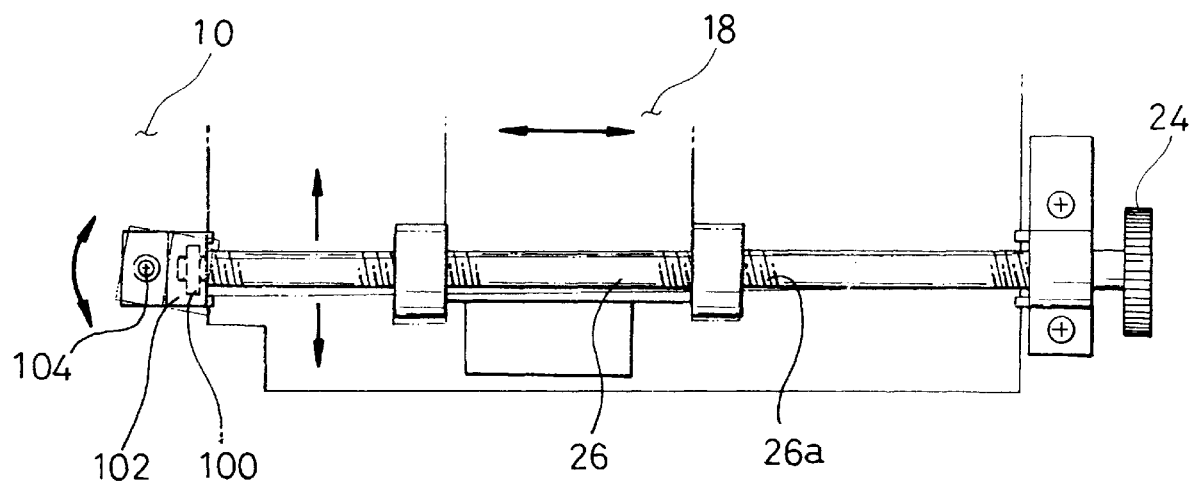
FIG. 4 is a plan view for illustrating feeding operation of the pick-up feeding device according to the preferred embodiment of FIGS. 3A and 3B.

Referring to FIG. 4, the lead screw 26 is disposed parallel to the guide shaft 28. That is, one end portion of the lead screw 26 is connected to the driven gear 24, and the other end thereof is rotatably mounted in the hollow portion 100a of the spherical bearing 100. The bearing holder 102 is then fixed to the deck base 10 by the fixing member 104.

The guide shaft 28 and the lead screw 26 for both guiding and feeding the pick-up base 18 are mounted in the fixing portion 30 and the bearing holder 102, respectively, and then the optical disc is mounted on the upper surface of the turntable 12, and the motor 20 drives the optical pick-up 16.

Thereafter, when the drive gear 22 drives the driven gear 24 to rotate the lead screw 26, the pick-up base 18 linearly and reciprocatively travels in a radial direction of the disc, i.e., in the horizontal X direction due to a rotational force of the lead screw 26, to record and reproduce magnetic information on and from the optical disc.

In case the lead screw 26 is not parallel to the horizontal X direction, i.e., is non-parallel with respect to the guide shaft 28, the horizontality of the lead screw 26 is regulated by firstly releasing the fixing member 104 and then rotating the bearing holder 102 about the axis of the fixing member 104 in a direction opposite to the tilted direction of the lead screw 26. Therefore, the lead shaft 26 can be made parallel to the guide screw 28, whereby the load exerted on the lead screw 26 when the optical pick-up 16 is fed can be minimized, and the pick-up base 18 can be accurately halted at a desired position.

Figure 5:
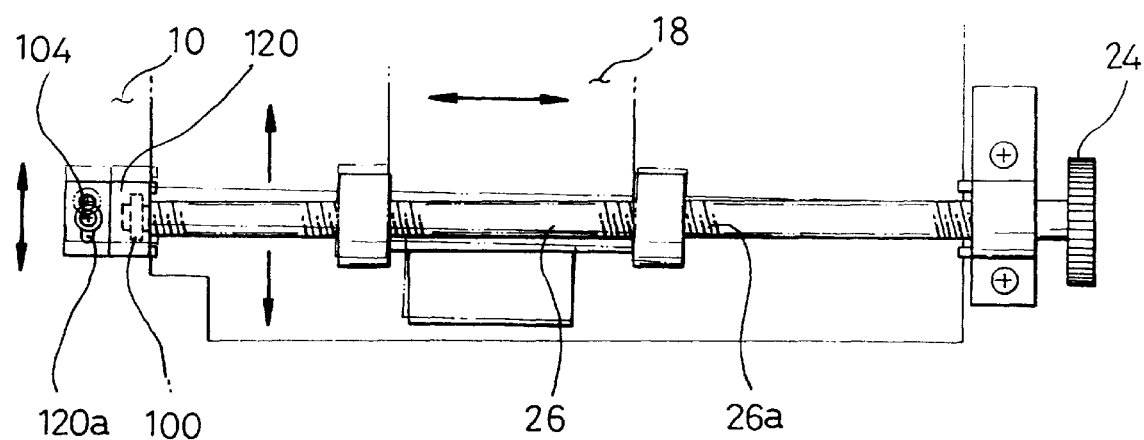
FIG. 5 is a plan view for showing a pick-up device according to another preferred embodiment of the present invention.

FIG. 5 shows a pick-up feeding device according to another preferred embodiment of the present invention.

Referring to FIG. 5, one end portion of a lead screw 26 is engaged with a driven gear 24, and another end thereof is inserted into a spherical bearing 100 which rotatably supports the lead screw 26. The spherical bearing 100 is inserted into a bearing holder 120 which regulates the horizontality of the lead screw 26. Formed in the bearing holder 120 are a slot 120a to receive a fixing member 104 for fixing the bearing holder 120 to a deck base 10, a bearing receiving recess 102b for receiving the spherical bearing 100, and pockets 102c communicating with the bearing recess 102b (as shown in FIG. 3C). In order to regulate the horizontal orientation of the lead screw 26, the fixing member 104 is slightly released, and the bearing holder 120 is adjusted by being linearly moved, with the slot 120a moved relative to the fixing member 104. Therefore, the horizontality of the lead screw 26 parallel to the X axis can be conveniently controlled.

As above-mentioned, according to the pick-up feeding device of the present invention, the horizontal orientation of the lead screw can be conveniently regulated by rotatably mounting an unthreaded end portion of the lead screw in a spherical bearing. Further, even when the lead screw is fixed to a fixing portion 102 which has been shrunk or twisted, the fixing portion 102 can be adjusted to correct the horizontal orientation of the feed screw, so that the optical pick-up can be easily fed. Moreover, during the feeding operation of the optical pick-up, the load exerted on the lead screw can be minimized and the pick-up base can be accurately halted at a desired position.

Although the preferred embodiments of the invention have been described, it is understood that the present invention should not be limited to these preferred embodiments, but various changes and modifications can be made by one skilled in the art within the spirit and scope of the invention as hereinafter claimed.

What is claimed is:

1. An apparatus to at least one of record to and reproduce information from an optical disc, comprising:
   a base;
   a turntable mounted on the base and rotatable about a first vertical axis, to support the optical disc;
   a first motor mounted on the base to rotate the turntable;
   a horizontal guide shaft mounted on the base;
   a horizontal lead screw mounted on the base, rotatable about a horizontal axis extending parallel to the guide shaft, a portion of the lead screw having an external screw thread;
   an optical pick-up mounted on and slidable along the guide shaft, and operably connected to the screw thread of the lead screw to be displaced thereby in a direction oriented radially with respect to the first vertical axis, in response to the rotation of the lead screw about the horizontal axis;
   a second motor mounted on the base and operably connected to a first end portion of the lead screw, to rotate the lead screw; and
   a lead screw regulating member mounted on the base, to support a second end portion of the lead screw and being displaceable relative to the base, and rotatable about a second vertical axis to adjust a horizontal orientation of the lead screw relative to that of the horizontal guide shaft.

2. The apparatus according to claim 1, wherein the lead screw regulating member comprises a holder having a recess in which the second end portion is mounted.

3. The apparatus according to claim 2, wherein the lead screw regulating member further comprises a hollow bearing mounted in the holder, the second end portion of the lead screw mounted in the hollow bearing for rotation therein about the horizontal axis.

4. The apparatus according to claim 3, wherein the recess has walls and pockets formed in the walls to receive the hollow bearing.

5. The apparatus according to claim 3, wherein the second vertical axis about which the holder is rotatable is spaced apart from the hollow bearing.

6. The apparatus according to claim 5, wherein the holder comprises a through-hole defining the vertical axis about which the holder is rotatable, and a fixing member extending vertically through the through-hole and connected to the base, to maintain contact between the holder and the base, wherein the holder rotates about the fixing member about the second vertical axis.

7. The apparatus according to claim 1, wherein the lead screw regulating member is displaceable by being linearly movable in a direction substantially perpendicular relative to the horizontal axis.

8. The apparatus according to claim 7, wherein the lead screw regulating member comprises a holder having a recess in which the second end portion is mounted.

9. The apparatus according to claim 8, wherein the lead screw regulating member further comprises a hollow bearing mounted in the holder, the second end portion of the lead screw mounted in the hollow bearing for rotation therein about the horizontal axis.

10. The apparatus according to claim 9, wherein the recess has walls and pockets formed in the walls to receive the hollow bearing.

11. The apparatus according to claim 9, wherein the holder comprises a slot extending substantially perpendicular to the horizontal axis, and a vertical fixing member mounted in the base and projecting through the slot, the holder being linearly movable relative to the fixing member.

12. An apparatus to at least one of record to and reproduce information from an optical disc, comprising:
    a base;
    a turntable mounted on said base and rotatable about a first axis, to support and rotate the optical disc;
    an optical pick-up movable in a first direction perpendicular and radial to the first axis;
    a guide shaft mounted on said base and extending along the first direction, and in contact with said optical pickup to guide said optical pickup in the first direction;
    a lead screw rotatable about a second axis perpendicular to said first axis, and having a screw thread engaging said optical pickup to move said optical pickup in the first direction; and
    a regulating member mounted on said base, to support a portion of said lead screw, and rotatable about a third axis parallel to the first axis to adjust an orientation of the second axis of the lead screw in a plane perpendicular to the first axis and relative to an orientation of the guide shaft.

13. The apparatus as claimed in claim 12, wherein said regulating member is movable to a position that the second axis is parallel to the first direction.

14. The apparatus as claimed in claim 13, wherein said regulating member comprises:

a holder having a recess with walls, wherein said walls have respective bearing receiving pockets; and
    an annular bearing having an opening and fitted within said bearing receiving pockets;
    wherein said opening receives the portion of said lead screw, the portion being an end portion of said lead screw.

15. The apparatus as claimed in claim 14, wherein:
    said regulating member further comprises a fixing member;
    said holder further comprises a through-hole; and
    said fixing member extends along the third axis, through said through-hole and into said base, and is adjustable to enable or disable rotation of said holder about said third axis.

16. The apparatus as claimed in claim 12, wherein said regulating member is movable in a linear second direction substantially parallel to the first direction, to adjust the orientation of the second axis of said lead screw in the plane.

17. The apparatus as claimed in claim 16, wherein said regulating member comprises:
    a holder having a recess with walls, wherein the walls have respective bearing receiving pockets; and
    an annular bearing having an opening and fitted within said bearing receiving pockets;
    wherein said opening receives the portion of said lead screw, the portion being an end portion of said lead screw.

18. The apparatus as claimed in claim 17, wherein:
    said regulating member further comprises a fixing member;
    said holder further comprises a linear slot extending in the second direction; and
    said fixing member extends along a third axis parallel to the first axis, through said slot and into said base, and is adjustable to enable or disable movement of said holder in said second direction.

19. An apparatus to at least one of record to and reproduce information from an optical disc, comprising:
    a base;
    a turntable mounted on the base and rotatable about a vertical axis, to support the optical disc;
    a first motor mounted on the base to rotate the turntable;
    a horizontal guide shaft mounted on the base;
    a horizontal lead screw mounted on the base, rotatable about a horizontal axis extending parallel to the guide shaft, a portion of the lead screw having an external screw thread;
    an optical pick-up mounted on and slidable along the guide shaft, and operably connected to the screw thread of the lead screw to be displaced thereby in a direction oriented radially with respect to the vertical axis, in response to the rotation of the lead screw about the horizontal axis;
    a second motor mounted on the base and operably connected to a first end portion of the lead screw, to rotate the lead screw; and
    a lead screw regulating member mounted on the base, and rotatable about a second vertical axis to support a second end portion of the lead screw and being displaceable relative to the base to adjust only a horizontal orientation of the lead screw relative to that of the guide shaft.

20. An apparatus to at least one of record to and reproduce information from an optical disc, comprising:

a base;

a turntable mounted on the base and rotatable about a vertical axis, to support the optical disc;

a first motor mounted on the base to rotate the turntable;

a horizontal guide shaft mounted on the base;

a horizontal lead screw mounted on the base, rotatable about a horizontal axis extending parallel to the guide shaft, a portion of the lead screw having an external screw thread;

an optical pick-up mounted on and slidable along the guide shaft, and operably connected to the screw thread of the lead screw to be displaced thereby in a direction oriented radially with respect to the vertical axis, in response to the rotation of the lead screw about the horizontal axis;

a second motor mounted on the base and operably connected to a first end portion of the lead screw, to rotate the lead screw; and a lead screw regulating member pivotally mounted to the base, to support a second end portion of the lead screw and being displaceable relative to the base to adjust a horizontal orientation of the lead screw relative to that of the horizontal guide shaft.

* * * * *